(12) United States Patent
Chen

(10) Patent No.: US 6,339,939 B1
(45) Date of Patent: Jan. 22, 2002

(54) PROCESS FOR THE CONVERSION OF A FLOW CONTAINING HYDROCARBONS BY PARTIAL OXIDATION

(75) Inventor: Zhijie Chen, Creteil (FR)

(73) Assignees: L'Air Liquide; Societe Anonyme pour l'Etude et l'Exploitation des Procedes Georges Claude, both of Paris Cedex (FR)

(*) Notice: Subject to any disclaimer, the term of this patent is extended or adjusted under 35 U.S.C. 154(b) by 0 days.

(21) Appl. No.: 09/568,140

(22) Filed: May 10, 2000

Related U.S. Application Data

(62) Division of application No. 09/134,671, filed on Aug. 14, 1998, now Pat. No. 6,110,980.

(30) Foreign Application Priority Data

Aug. 14, 1997 (FR) .............................. 97 10400

(51) Int. Cl.⁷ ................................ F25J 3/00
(52) U.S. Cl. ................... 62/646; 62/240; 62/901; 62/939
(58) Field of Search ................ 62/646, 901, 939, 62/240

(56) References Cited

U.S. PATENT DOCUMENTS

| | | | |
|---|---|---|---|
| 2,940,268 A | * 6/1960 | Morrison | 62/240 |
| 3,161,492 A | * 12/1964 | Keith et al. | 62/911 |
| 4,041,721 A | * 8/1977 | Kneil | 62/240 |
| 4,705,548 A | 11/1987 | Agrawal et al. | |
| 4,783,210 A | 11/1988 | Ayres et al. | |
| 4,947,649 A | * 8/1990 | Agrawal et al. | 62/646 |
| 5,037,462 A | * 8/1991 | Schweigert | 62/939 |
| 5,361,590 A | 11/1994 | Rathbone | |
| 5,404,725 A | * 4/1995 | Arriulou | 62/939 |
| 5,485,729 A | 1/1996 | Higginbotham | |
| 5,551,258 A | 9/1996 | Rathbone | |
| 5,582,032 A | 12/1996 | Shelton et al. | |
| 5,832,748 A | * 11/1998 | Bonaquist | 62/901 |

FOREIGN PATENT DOCUMENTS

| | | |
|---|---|---|
| DE | 3706733 A1 | 9/1987 |
| DE | 3688026 T2 | 6/1993 |
| DE | 4336769 C1 | 6/1995 |
| DE | 19623310 A1 | 11/1996 |
| DE | 69308678 T2 | 7/1997 |
| DE | 69314245 T2 | 1/1998 |
| EP | 0 606 027 | 7/1994 |
| EP | 0 748 763 | 12/1996 |
| EP | 0770840 A2 | 5/1997 |
| EP | 07798522 A2 | 10/1997 |
| NO | 179988 | 10/1996 |

OTHER PUBLICATIONS

Hakan V. Svensson, "Distillation Problems on a Floating Plant", Chem. Eng. Prog., Nov. 1982, vol. 78, No. 11, pp. 43–46, XP002064388.

W.H. Aitken, "Nitrogen for Inerting", Tanker & Bulk Carrier, Nov. 1973, pp. 9–15, XP002064389.

* cited by examiner

*Primary Examiner*—Ronald Capossela
(74) *Attorney, Agent, or Firm*—Young & Thompson

(57) ABSTRACT

Air is distilled in a single column installed on a boat, and from here an oxygen-enriched liquid flow is drawn off. This flow is pressurized by a pump and vaporized by heat exchange with air or nitrogen. The oxygen is used for the partial oxidation of a flow contained hydrocarbons, for example natural gas.

9 Claims, 2 Drawing Sheets

PROCESS FOR THE CONVERSION OF A FLOW CONTAINING HYDROCARBONS BY PARTIAL OXIDATION

CROSS-REFERENCE TO RELATED APPLICATIONS

This application is a division of application Ser. No. 09/134,671, filed Aug. 14, 1998, now U.S. Pat. No. 6,110, 980.

FIELD OF THE INVENTION

The present invention relates to a process and to a plant for the conversion of a flow containing hydrocarbons by partial oxidation.

BACKGROUND OF THE INVENTION

In this type of process, a flow containing hydrocarbons, typically natural gas, is converted into synthesis gas after partial oxidation with oxygen or oxygen-enriched air.

This conversion can be carried out by a reforming process, for example of the ATR (Autothermal Reforming) type, which mates it possible to produce a synthesis gas. Following catalytic conversion, the synthesis gas is converted into liquid hydrocarbons (kerosene, diesel, naphtha).

This type of process is described in U.S. Pat. No. 5,628, 931, WO 93 15999, GB 2249555, GB 2183672, EP 214 432 A.

SUMMARY OF THE INVENTION

The present invention also relates to a process and to a plant for the separation of air by cryogenic distillation and, in particular, to those processes and plants which make it possible to produce oxygen.

According to one subject of the invention, a process is provided for the conversion of a flow containing hydrocarbons by partial oxidation with oxygen, characterized in that the oxygen needed for the conversion is separated by cryogenic distillation from air in a single column installed on a boat.

According to other aspects of the invention, the flow containing hydrocarbons is methane, natural gas or LPG, the oxygen is drawn off from the single column in liquid form, pressurized and vaporized, the conversion is carried out by a reforming process producing a synthesis gas, which reforming is followed by catalytic conversion of the synthesis gas into liquid hydrocarbons, the nitrogen needed for the process is produced by adsorption or permeation.

According to another subject of the invention, a plant is provided for the conversion of a flow containing hydrocarbons, comprising a partial-oxidation unit fed with oxygen, characterized in that it comprises air separation apparatus including a single column (8) installed on a boat.

Oxygen is generally produced by the distillation of air in a double column. When this column is placed on an unstable support, such as the deck of a boat, the quality of the distillation is degraded because the plates or packing contained in the column cannot function correctly.

"Nitrogen for Inerting" Tank and Bulk Carrier, November 1973 and "Distillation Problems on a Floating Plant" CEP, November 1982, describe solutions for improving distillation on a boat.

The object of this invention is to provide an air separation process which is compatible with the working conditions on a boat.

According to another subject of the invention, a process is provided for the separation of air by cryogenic distillation in a single column, in which i) air to be distilled is sent into a single column where it is separated into a nitrogen-enriched vapour and an oxygen-enriched liquid, ii) the base of the column is heated by means of a boiler, characterized in that at least some of the oxygen-enriched liquid is drawn off, pressurized and vaporized by heat exchange with a pressurized flow.

According to other aspects of the invention, the fluid used to heat the boiler is nitrogen or at least some of the air to be distilled, the air sent to the boiler comes from a turbine, optionally coupled to a booster, the pressurized flow is air at a boosted pressure or compressed nitrogen, vapour is drawn off from the head of the column and at least some of it is compressed, at least some of the compressed nitrogen is recycled to the column, oxygen-enriched liquid is produced, at least some of the air intended for the column is cooled to an intermediate temperature in a heat exchanger, before being expanded, optionally to the column pressure, in a turbine.

According to another subject of the invention, a plant is provided for the separation of air by cryogenic distillation, comprising, a single column, means for feeding the single column with air, a boiler at the base of the single column, means for sending a heating fluid to the boiler, characterized in that it comprises means for drawing off an oxygen-enriched liquid from the base of the single column, means for pressurizing at least some of the liquid, means for vaporizing at least some of the pressurized liquid by heat exchange with a pressurized flow.

According to other aspects of the invention, the boiler is heated with nitrogen or at least some of the air to be distilled, the boiler is connected to a turbine, the pressured flow is air at a boosted pressure or compressed nitrogen, means are provided for compressing a nitrogen-enriched flow drawn off from the head of the column, the single column contains plates or structured packing.

BRIEF DESCRIPTION OF THE DRAWINGS

Other aspects of the invention will now be described with reference to FIGS. 1 to 4, which are diagrams of processes according to the invention.

DETAILED DESCRIPTION OF THE INVENTION

Figure 1:
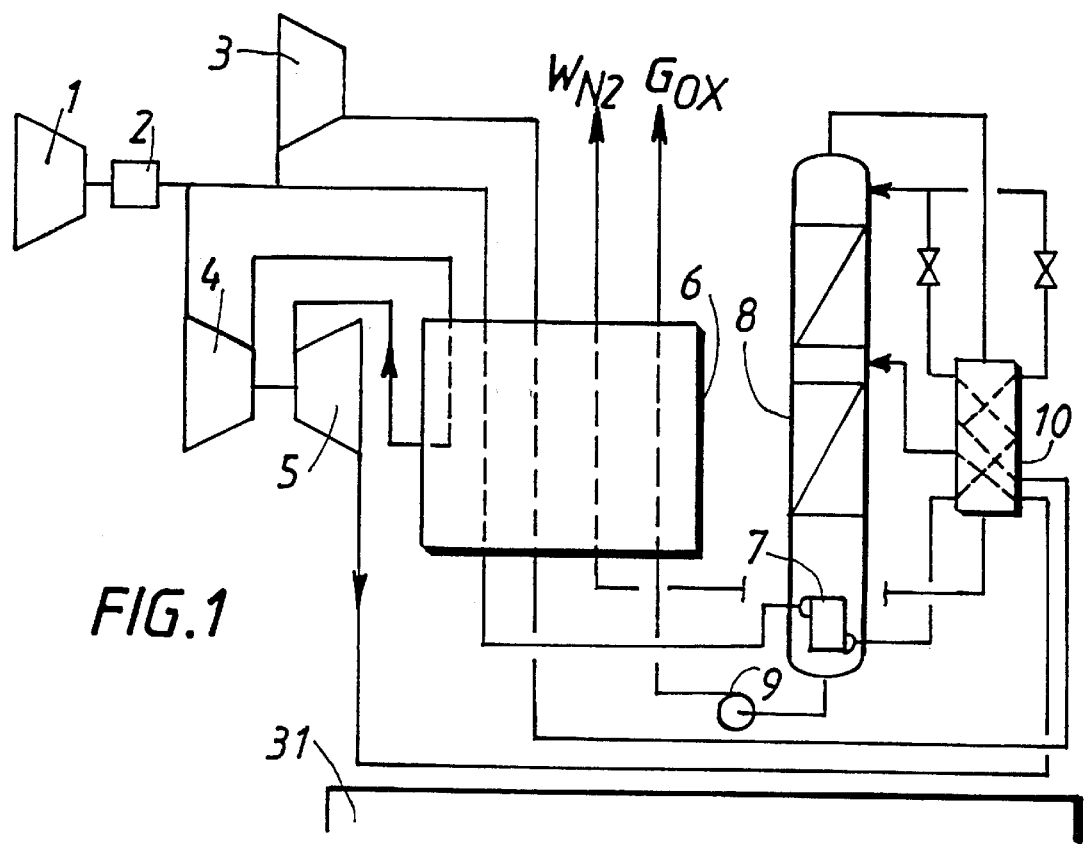

In FIG. 1, an air flow is compressed by the compressor 1 to 4.5 bar and purified in the unit 2 to remove water and $CO_2$.

A first fraction of the air has its pressure raised to 6 bar by the booster 4, is partially cooled in the exchanger 6 and is expanded in the turbine 5 to 1.4 bar. The fraction is then supercooled in the exchanger 10 before being sent to the column 8 installed on a boat 31.

A second air fraction has its pressure raised to 70 bar in the booster 3 and condensed at least partially in the exchanger 6.

The rest of the air passes fully through the exchanger 6, condenses at least partially in the base boiler 7 and is sent to the head of the column 8, after having been supercooled and expanded in a valve.

A flow containing oxygen with a purity of at least 95% in liquid form is drawn off from the base of the column 8, pumped to 36 bar (in 9) and vaporized in the exchanger 6 by heat exchange with air at a boosted pressure of 70 bar.

Nitrogen-enriched vapour is drawn off from the head of the column 8 and heated in the exchangers 10 and 6.

Figure 2:
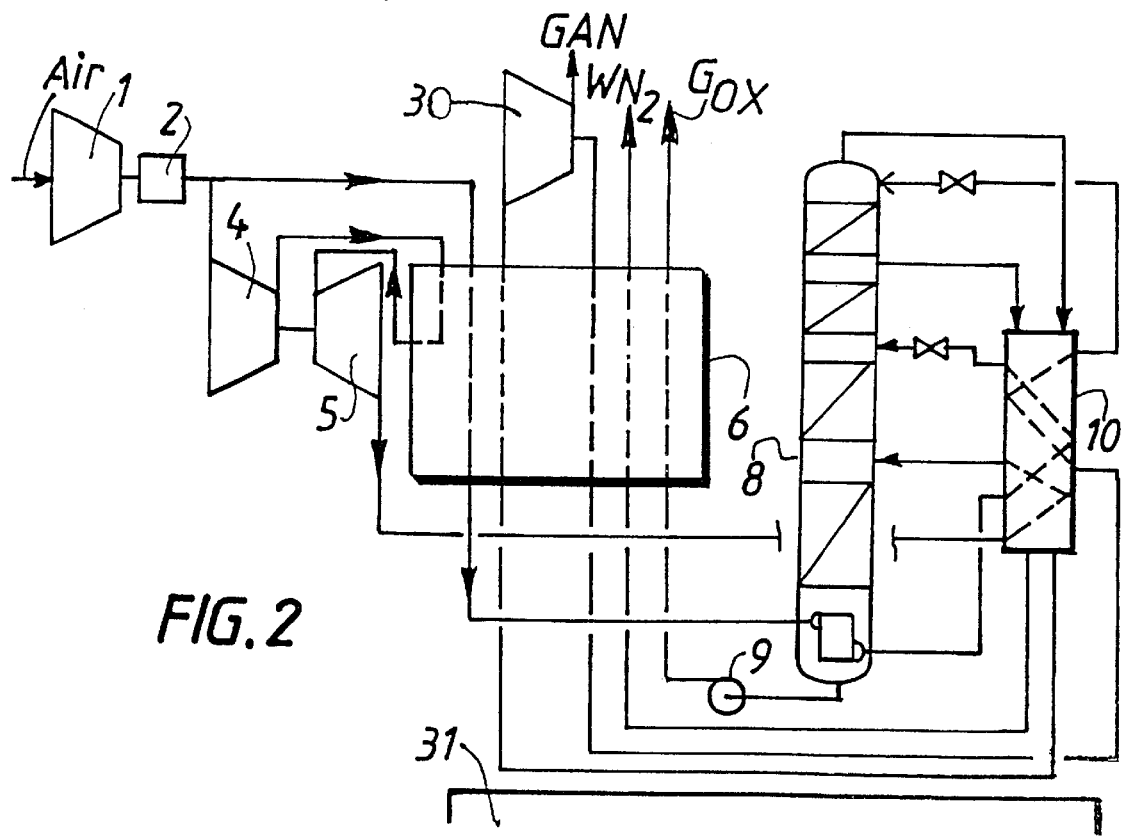

FIG. 2 shows the booster turbines 4, 5, but the booster 3 is replaced by a nitrogen cycle.

Nitrogen-enriched vapour is heated to ambient temperature and compressed to 70 bar by a compressor 30. At least some of the compressed nitrogen is recycled to the column after having been cooled in the exchangers 6 and 10.

The process may be simplified (FIG. 3) to use a single air compressor. All of the air is compressed by the compressor 4 to about 28 bar and then cooled in the exchanger 6 to an intermediate temperature, at which some of the air is drawn off, expanded and sent into the boiler 7 where it condenses at least partially before being expanded in a valve and sent to the head of the column 8. The rest of the air continues to cool and is liquefied in the exchanger 6, is supercooled in the exchanger 10 and is sent to the column, after having been mixed with the other part of the air.

Figure 3:
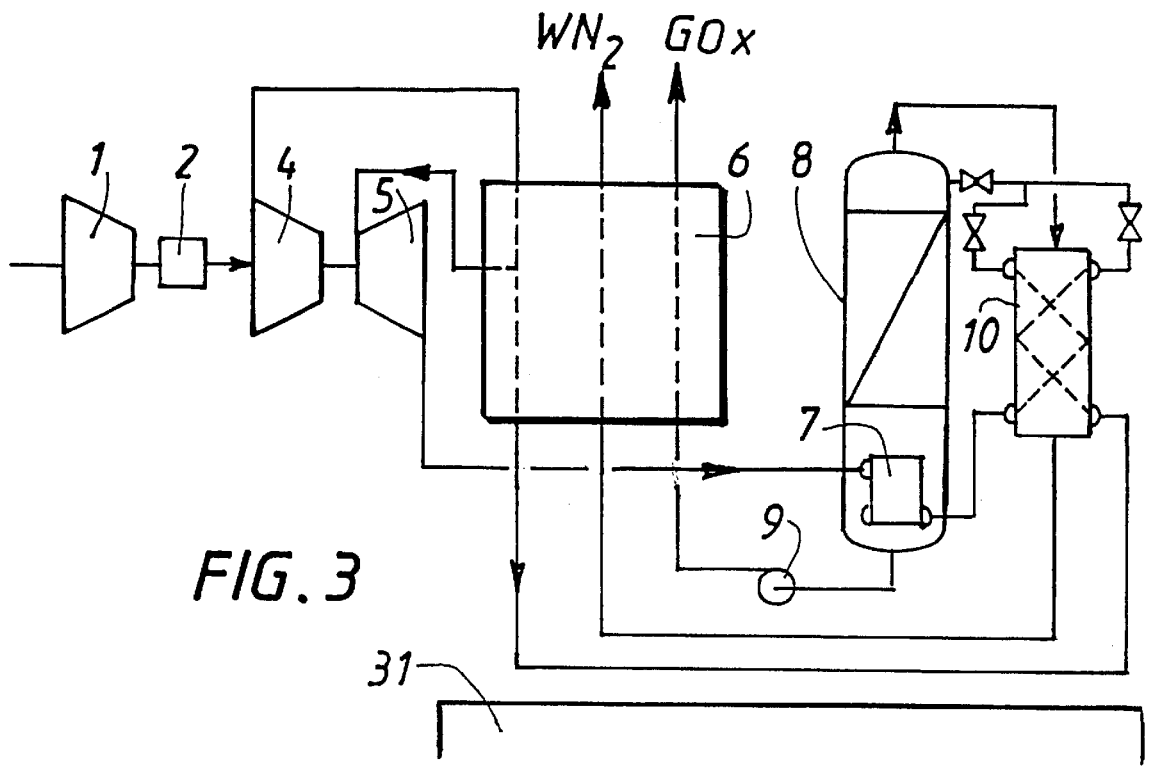
Figure 4:
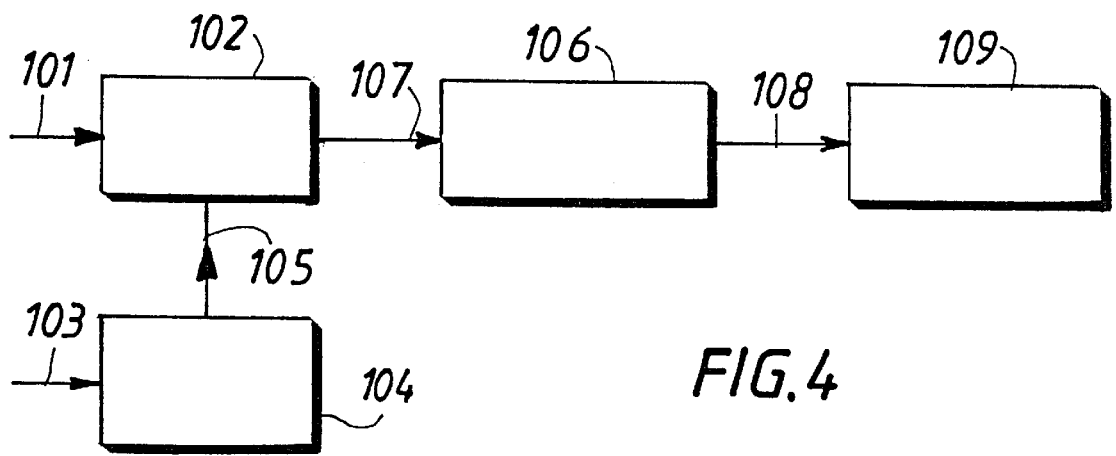

FIG. 4 shows a process diagram according to the invention, in which the air 103 is distilled in an air separation unit 104 such as those illustrated in FIGS. 1 to 3.

Vaporized liquid oxygen 105 is sent to a partial-oxidation unit 102, also supplied with natural gas 101. The synthesis gas 107 produced in this way undergoes a catalytic conversion step 109 (of the FISCHER-TROPSCH type), in order to produce liquid hydrocarbons (kerosene, diesel and/or naphtha).

What is claimed is:

1. Plant for the separation of air by cryogenic distillation, comprising,
   a single column,
   means for feeding the single column with air,
   a boiler at the base of the single column,
   means for sending a heating fluid to the boiler,
   means for drawing off an oxygen-enriched liquid from the base of the single column,
   means for pressurizing at least some of the liquid,
   means for vaporizing at least some of the pressurized liquid by heat exchange with compressed nitrogen, and
   a turbine with a turbine outlet, the turbine outlet being connected to the boiler,
   wherein the heating fluid is air.

2. Plant according to claim 1, in which the pressured flow is air at a boosted pressure.

3. Plant according to claim 1, comprising for compressing a nitrogen-enriched flow drawn off from a head of the column.

4. Plant according to claim 1, in which the single column contains plates.

5. Plant according to claim 1, in which the single column contains structured packing.

6. Plant according to claim 1, further comprising a means for sending to the single column, all of the heating fluid to send all the fluid sent to the boiler.

7. Plant according to claim 1, wherein the connection between the turbine outlet and the boiler is free of any cooling means.

8. A boat having installed on at least one deck, a plant for the separation of air by cryogenic distillation, comprising
   a single column,
   means for feeding the single column with air,
   a boiler at the base of the single column,
   means for sending a heating fluid to the boiler,
   means for drawing off an oxygen-enriched liquid from the base of the single column,
   means for pressurizing at least some of the liquid,
   means for vaporizing at least some of the pressurized liquid by heat exchange with a pressurized flow,
   the heating fluid being air, and
   a turbine with a turbine outlet,
   the turbine outlet being connected to the boiler.

9. Plant for the separation of air by cryogenic separation, comprising:
   a single column;
   a means for feeding the single column with cooled compressed air;
   a boiler at the base of the single column;
   a means for sendinf air as a heating fluid to the boiler;
   a means for drawing off an oxygen-enriched liquid from the base of the single column;
   a means for pressurizing at least some of the liquid;
   a means for vaporizing at least some of the pressurized liquid by heat exchange with a pressurized stream; and
   a turbine whose inlet is connected to an air compressor but not to a reboiler and whose outlet is connected to an intermediate point of the single column.

* * * * *